United States Patent [19]

Steiner

[11] Patent Number: 5,543,675
[45] Date of Patent: Aug. 6, 1996

[54] BRUSH LEAF MEANS

[75] Inventor: Jean-Pierre Steiner, Villers-Le-Lac, France

[73] Assignee: Johnson Electric S.A, Switzerland

[21] Appl. No.: 158,111

[22] Filed: Nov. 24, 1993

[30] Foreign Application Priority Data

Nov. 25, 1992 [GB] United Kingdom ............... 9224715

[51] Int. Cl.⁶ .................. H02K 13/00; H01R 39/18; H01R 39/36; H01R 39/08
[52] U.S. Cl. ................ 310/248; 310/233; 310/249
[58] Field of Search ................ 310/71, 231, 236, 310/238, 248, 242

[56] References Cited

U.S. PATENT DOCUMENTS

| | | | |
|---|---|---|---|
| 2,850,653 | 9/1958 | Naul | 310/68 |
| 3,816,783 | 6/1974 | Nakamura et al. | 310/246 |
| 4,086,510 | 4/1978 | Watanabe | 310/242 |
| 4,163,916 | 8/1979 | Kobayshi | 310/246 |
| 4,368,398 | 1/1983 | Mabuchi | 310/248 |
| 4,494,026 | 1/1985 | Abe | 310/89 |
| 4,494,029 | 1/1985 | Hoshino et al. | 310/239 |
| 4,529,899 | 7/1985 | Mabuchi et al. | 310/40 MM |
| 4,843,272 | 6/1989 | Mabuchi | 310/239 |
| 4,851,729 | 7/1989 | Baines | 310/239 |

FOREIGN PATENT DOCUMENTS

| | | |
|---|---|---|
| 206046 | 1/1984 | Denmark . |
| 224722 | 7/1985 | Denmark . |
| 0987375 | 6/1963 | United Kingdom . |
| 1021997 | 10/1964 | United Kingdom . |
| 1065747 | 6/1965 | United Kingdom . |
| 1513502 | 6/1978 | United Kingdom . |
| 2044554 | 2/1980 | United Kingdom . |
| 2140630 | 5/1984 | United Kingdom . |
| 2180999 | 9/1986 | United Kingdom . |
| 2180999 | 4/1987 | United Kingdom . |

*Primary Examiner*—Steven L. Stephan
*Assistant Examiner*—Michael Wallace
*Attorney, Agent, or Firm*—Ostrolenk, Faber, Gerb & Soffen, LLP

[57] ABSTRACT

Each of the two brush leafs of an electric motor comprises a first resiliently flexible conductive section, attached to a terminal, and an additional resiliently flexible section extending an acute angle to the first section. The first and second ends of the first section are disposed on opposite sides of a contact portion of the additional section which engages a commutator forming part of the motor. It is therefore possible to increase the length of the first section to thereby provide robust brush leafs which are nevertheless capable of flexing sufficiently to accommodate discrepancies in the mounting of the brush leaf means and in concentricity of the commutator.

5 Claims, 1 Drawing Sheet

5,543,675

BRUSH LEAF MEANS

FIELD OF THE INVENTION

The invention relates to brush leaf means for a rotary electrodynamic machine such as an electric motor.

BACKGROUND ART

In one known electric motor construction, the first ends of two relatively rigid brush arms are pivotally mounted on an end cap and the opposite ends of a tension spring are connected to the second ends of the brush arms to urge these second ends towards the commutator. As a result, the brushes are suitably pressed into engagement with the commutator. However, installation of the brush arms is complicated, particularly if automated procedures are adopted. It is also normally necessary to fit insulators between the brush arms and the opposite ends of the tension spring, thus increasing the cost and adding to the difficulty of installing the brush arms.

To overcome these problems, it has been proposed, GB 987 375, to replace the tension spring with two blade springs pressed, respectively, from the two brush arms and arranged to engage the brush arm support means to urge the brush arms resiliently towards the commutator.

Another solution is to replace the relatively rigid brush arms with resiliently flexible brush leaf means. Brush leaf means of this form each comprise a first end, which is rigidly attached to a brush leaf support in the form of a terminal, and a contact portion. However, as a result of a manufacturing imperfections, it is impossible to ensure concentricity of an electric motor commutator or precise mounting of the first end of the brush leaf means. The brush leaf means must therefore be mounted so that the contact portion is resiliently urged towards the commutator and the brush leaf means must have sufficient resilient deformability to accommodate the maximum anticipated spacial discrepancies while maintaining adequate pressure between the commutator and the contact means incorporated in or supported by the contact portion of the brush leaf means.

One way to accommodate constructional tolerances is to provide brush leaf means of very thin material which can easily flex. However, in this case, the brush leaf means are not normally sufficiently robust and are not always capable of providing sufficient resilient loading on the commutator. An alternative solution is to form the brush leaf means of thicker material, but of greater length from a first, terminal end of the brush leaf means to the contact portion. However, the extent to which this solution can be applied is limited by the size of the electric motor and, normally, by the size of the end cap in which the brush leaf means are supported.

It has therefore been proposed to increase the effective length of the brush leaf means accommodated within a prescribed space by forming the brush leaf means as a plurality of sections which are connected to each other, but extend in different directions. Thus, as disclosed in GB 2 180 999, brush leaf means, for an electrodynamic machine, comprise a first resiliently flexible conductive section which has a first end, for fixed, non-pivotal attachment to a brush leaf support, and a second end; and at least one additional resiliently and independently flexible conductive section, which each have first and second ends, wherein the first end of each additional section is attached to the second end of another resiliently flexible conductive section; at least one said additional section extends in spaced relation to an adjacent resiliently flexible conductive section in a direction, from first end to second end, having at least a major directional component opposite the direction in which said adjacent section extends from the first end to the second end of said adjacent section; and one additional section has a free second end, to which no first end of any other additional section is connected, and a contact portion.

However, the construction disclosed in GB 2 180 999 is limited to brush leaf means in which the first resiliently flexible conductive section extends, from a first end to a second end, away from the contact portion and in which there is only one additional resiliently flexible conductive section. As a result, the first and second ends of the first resiliently flexible section are disposed on the same side of the contact portion. This arrangement imposes severe limitations on the effective length of the brush leaf means in that there is normally very little space between the support to which the first end of the first resiliently flexible conductive section is attached, and the outer enclosure of the electrodynamic machine.

DISCLOSURE OF THE INVENTION

It is the purpose of the invention to at least reduce the disadvantages of known brush leaf means and, in particular, to provide brush leaf means which have greater effective length relative, for example, to the side of an end cap in which the brush leaf means are mounted.

This is achieved by providing brush leaf means in which the first and second ends of at least one resiliently flexible conductive section, other than the additional section having the free second end and the contact portion, are disposed on opposite sides of said contact portion.

Thus, according to the invention, there is provided brush leaf means for an electrodynamic machine comprising a first resiliently flexible conductive section which has a first end, for fixed, non-pivotal attachment to a brush leaf support, and a second end; and at least one additional resiliently and independent flexible conductive section, which each have first and second ends, wherein the first end of each additional section is attached to the second end of another resiliently flexible conductive section; at least one said additional section extends in spaced relation to an adjacent resiliently flexible conductive section in a direction, from first end to second end, having at least a major directional component opposite the direction in which said adjacent section extends from the first end to the second end of said adjacent section; one additional section has a free end, to which no first end of any other additional section is connected, and a contact portion; and the first and second ends of at least one resiliently flexible conductive section, other than the additional section having the free second end and the contact portion, are disposed on opposite sides of said contact portion.

This form of construction provides brush leaf means in which at least one of the resiliently flexible conductive sections can extend from one side of the outer enclosure of the electrodynamic machine to the other, thus providing a longer and more flexible conductive section to accommodate discrepancies in the positioning of the brush leaf means and radial inaccuracy in the position of the rotary contact, such as a commutator, engaged by the brush leaf means.

According to the invention, the contact portion of the brush leaf means may be adapted to support contact means, such as a carbon brush, for engagement with a rotary contact forming part of the electrodynamic machine. However, in a simpler form of construction, contact portion may be adapted for direct engagement with the rotary contact and, in a preferred embodiment, the additional resiliently flexible conductive section having the free second end and the contact portion comprises at least two fingers.

Preferably, each resiliently flexible conductive section of the brush leaf means extends rectilinearly, but at least one section may be curved. However, each section preferably extends rectilinearly and at an acute angle to said adjacent section. It is also possible that adjacent section extends laterally alongside each other.

Each resiliently flexible conductive section of the brush leaf means may form part of a continuous strip which is folded at regions which constitute the second end of one section and the first end of an adjacent section. However, in a preferred embodiment, all adjacent sections are parts of a single stamped sheet. With this latter form of construction, it is difficult to provide brush leaf means with more than one additional resiliently flexible conductive section and, in practice, this is all that is necessary to provide the required flexibility. For this reason, it is normally unnecessary to provide more than one additional section even in brush leaf means of folded construction where zig-zag formation with two or more additional sections could be quite easily provided.

Brush leaf means according to the invention are hereinafter described, by way of example, with reference to the accompanying drawings.

BEST MODE FOR CARRYING OUT THE INVENTION

Figure 1:
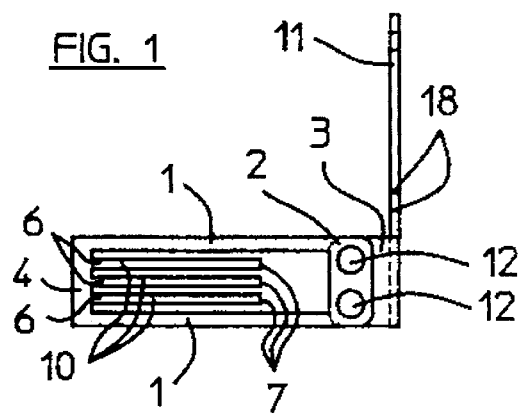
FIGS. 1 to 3 are plan, sectional side elevation and end elevation views of a brush assembly incorporating brush leaf means according to the invention.
Figure 2:
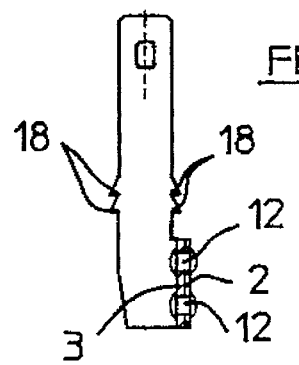
Figure 3:
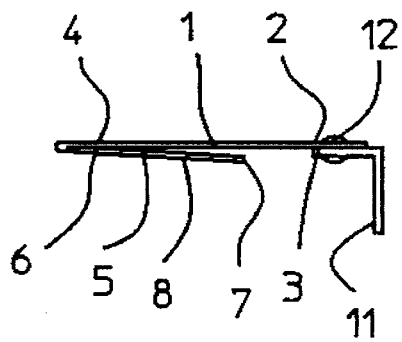

As shown in FIGS. 1 to 3 brush leaf means according to invention comprise a first resiliently flexible conductive section 1 attached, at a first end 2, to a laterally extending tab 3 of a brass sheet terminal 11 by means of rivets 12.

Figure 4:
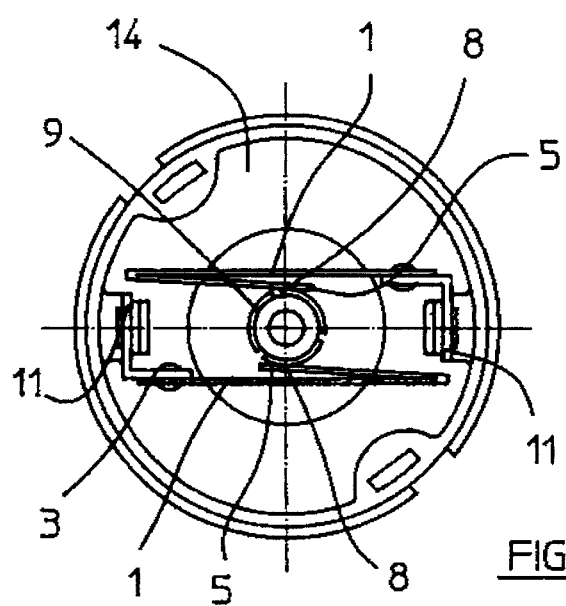
FIG. 4 is an axial view of the interior of an end cap of an electric motor fitted with two brush assemblies as shown in FIGS. 1 to 3 and showing a commutator of the electric motor engaged by the brush assemblies.

The brush leaf means are stamped from a sheet of beryllium copper and include an additional resiliently flexible conductive section 5, in the form of three laterally spaced fingers 10, having a first end 6 attached to a second end 4 of the first section 1, remote from the first end 2 riveted to the tab 3, and a second end 7 remote from its first end 6. As shown in FIGS. 3 and 4, the additional section 5 formed by the laterally spaced fingers 10 extends at an acute angle to the first section 1 attached to the tab 3 and, as shown more clearly in FIGS. 4 and 6, each of the fingers 10 forming the additional section 5 is formed with a contact portion 8 which engages a commutator 9 of the electric motor.

Figure 6:
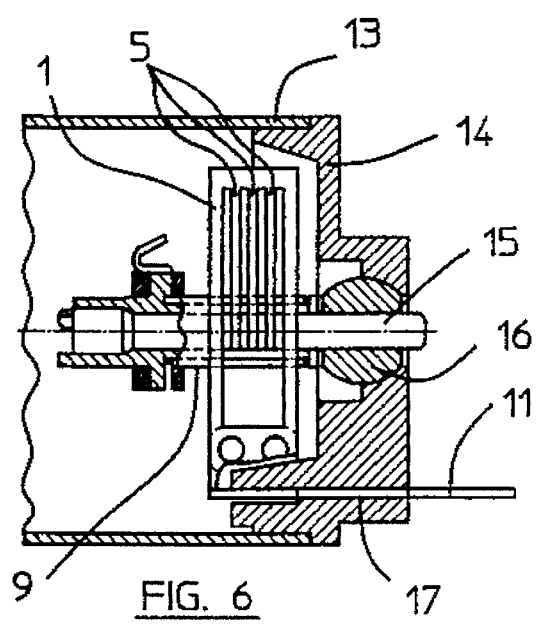
FIGS. 5 and 6 are schematic sectional views of part of an electric motor, in side elevation and plan, showing the position of one of the brush assemblies relative to the other parts of the electric motor.
Figure 5:
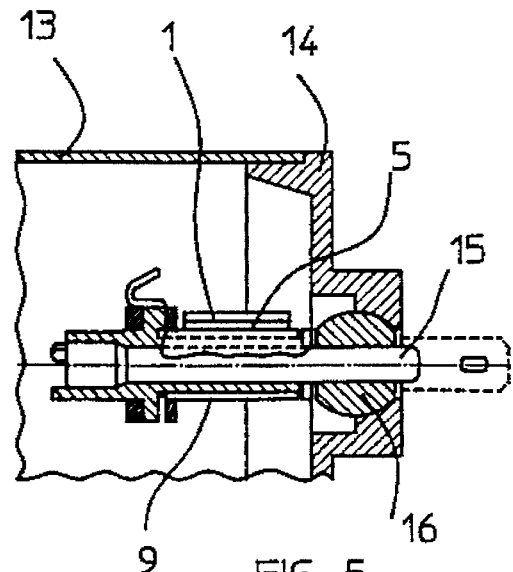

As shown in FIGS. 4 to 6, the electric motor has a canister 13 fitted with an end cap 14. The motor shaft 15 carrying the commutator 9 is mounted in a self-aligning bearing 16 seated in the end cap 14 and the terminal 11 extends through a slot 17 formed in the end cap 14. Spurs 18 (FIG. 2) formed on opposite sides of the terminal 11 engage opposite sides of the slot 17 to secure the terminal 11 more firmly in the slot 17.

Although the brass sheet terminals 11 are thicker than the beryllium copper sheet from which the brush leaf means are stamped, in order to provide a rigid external connection, the beryllium copper sheet is relatively thick, thus providing robust brush leaf means. However, because of the extended length of the first section 1 of the brush leaf means, the brush leaf means are quite flexible and capable of being resiliently loaded against the commutator 9 even though the mounting of the terminal 11 in the end cap 14 and the concentricity of the commutator 9 are subject to variation, in different motors, as a result of manufacturing tolerances.

What is claimed is:

1. A brush leaf for an electrodynamic machine of the type including a commutator, the brush leaf comprising:

a first resiliently flexible conductive section which has a first end fixed in a non-pivotal manner to a brush leaf support and a second end, said first section extending across said commutator such that said first end is located on one side of said commutator and said second end is located on another side of said commutator; and a plurality of additional resiliently and independently flexible conductive sections each of which have respective proximal and distal ends and a contact portion, said proximal end of each said additional section being attached to said second end of said first section and said distal end of each said additional section extending away from said proximal end and across said commutator such that said additional section is in sliding contact with said commutator and said distal end is located on the same side of said commutator as said first end of said first section, said contact portion of each said additional resiliently flexible conductive section being disposed facing away from said first resiliently flexible conductive section, the distance each of said plurality of additional sections extends from its proximal end to a point at which it is in sliding contact with said commutator being less than the distance said first section extends from its first to its second end.

2. The brush leaf, according to claim 1, in which the contact portion is adapted for sliding engagement with a rotary contact forming part of the electrodynamic machine.

3. The brush leaf, according to claim 2, in which the number of said plurality of additional resiliently flexible conductive sections is two.

4. The brush leaf, according to claim 1, in which each of said additional resiliently flexible conductive sections extends at an acute angle to said first resiliently flexible conductive section.

5. The brush leaf, according to claim 1, in which each of said plurality of additional resiliently flexible conductive sections forms part of single stamped sheet.

* * * * *